United States Patent [19]

Vargas et al.

[11] Patent Number: 5,579,875
[45] Date of Patent: Dec. 3, 1996

[54] SELF LOCKING STRUT

[75] Inventors: Larry Vargas, Riverside; Darrell L. James, Corona, both of Calif.

[73] Assignee: Hartwell Corporation, Placentia, Calif.

[21] Appl. No.: 438,064

[22] Filed: May 8, 1995

[51] Int. Cl.[6] .......................................................... F16F 9/32
[52] U.S. Cl. .......................................... 188/300; 292/338
[58] Field of Search ........................ 267/64.12; 188/300; 16/85, DIG. 17, DIG. 21; 292/338, 261, 303, 304, DIG. 4, DIG. 19, DIG. 43; 296/56, 76, 106; 248/351, 352

[56] References Cited

U.S. PATENT DOCUMENTS

| 4,890,703 | 1/1990 | Hathaway | 188/300 |
| 4,925,230 | 5/1990 | Shelton | 16/DIG. 10 X |
| 5,217,267 | 6/1993 | Yagi | 292/DIG. 4 X |

*Primary Examiner*—Josie Ballato
*Attorney, Agent, or Firm*—Harris, Wallen, MacDermott & Tinsley

[57] ABSTRACT

A collapsible strut for connection between a first member and a second member mounted on the first member. The strut includes first and second telescoping elements movable between a collapsed position and an extended position, a catch pivotally mounted on the first element and being moveable between a locked position and an unlocked position, a spring interengaging the catch and first element for urging the catch to the locked position, a detent interengaging the catch and first element for maintaining the catch in the unlocked position, a pin carried on the catch and engageable with a notch of the second element for locking the elements in the extended position, with the catch moving the pin out of engagement with the second element when pivoted to the unlocked position permitting movement of the second element from the extended position to the collapsed position, and a ramp on the second element and engageable with the catch for moving it out of the unlocked position when the second element arrives at the closed position.

9 Claims, 4 Drawing Sheets

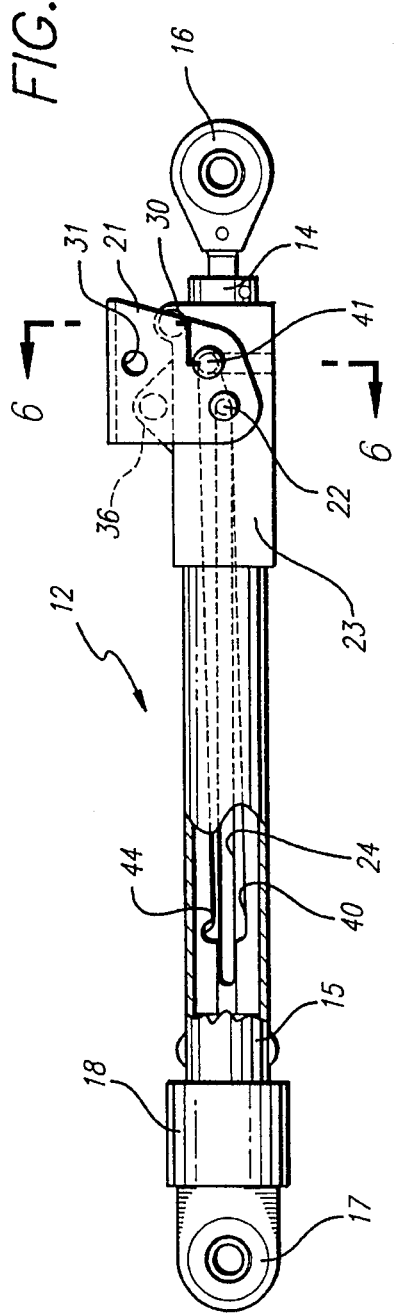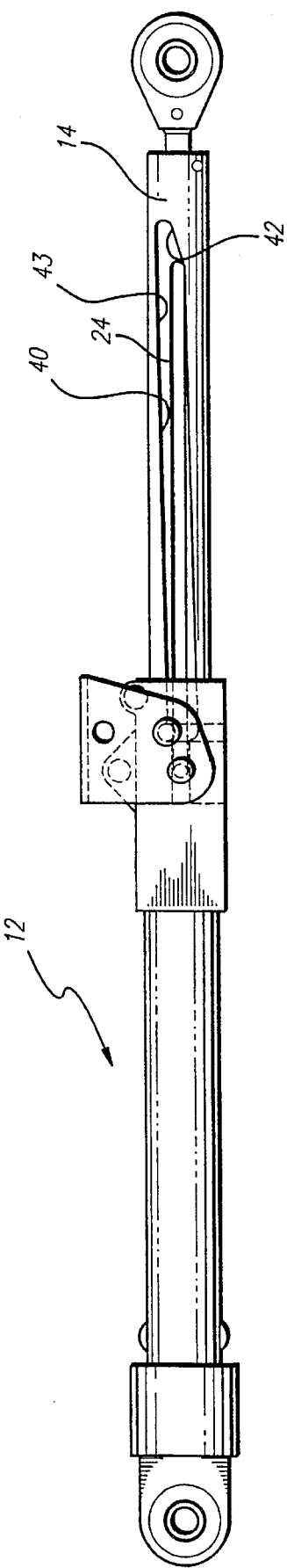

SELF LOCKING STRUT

BACKGROUND OF THE INVENTION

This invention relates to a new and improved strut suitable for use in holding open a door or other closure, such as a radome cover, an access panel, a cowl door, and the like. The strut is moveable between a collapsed position when the door is closed and an extended position when the door is open, and the strut must provide for locking in the open or extended position.

A conventional strut has some mechanism for locking the strut in the extended position and a trigger or catch which unlocks the strut and permits collapse of the strut and closure of the door. However, in the conventional strut, the trigger or catch must be held in the unlocked position until the door is moved toward the closed position. This is a difficult operation to carry out when two or more struts are used for large doors and other closures. Typically, two people are required for such an operation, with each person holding a catch in the unlocked position until they move the door toward the closed position.

It is an object of the present invention to provide a new and improved collapsible strut which will automatically lock when moved to the extended position and which provides for maintaining the catch in the unlocked condition during the closure operation, with the catch then automatically returning to the locked position when the strut is fully collapsed. The strut may be moved from the collapsed position to the extended position and will automatically lock in the extended position without requiring any manual actuation on the catch.

Other objects, advantages, features and results will more fully appear in the course of the following description.

SUMMARY OF THE INVENTION

A collapsible strut for connection between a first member and a second member mounted on the first member, and including first and second telescoping elements movable between a collapsed position and an extended position, a catch pivotally mounted on the first element, and being moveable between a locked position and an unlocked position, first means interengaging the catch and first element for urging the catch to the locked position, seconds means interengaging the catch and first element for maintaining the catch in the unlocked position, third means carried on the catch and engageable with the second element for locking the elements in the extended position, with the catch moving the third means out of engagement with the second element when the catch is pivoted to the unlocked position permitting movement of the second element from the extended position to the collapsed position, with the second means maintaining the catch in the unlocked position while the second element is moving from the extended position to the collapsed position, and fourth means carried on the second element and engageable with the catch for moving the catch out of the unlocked position when the second element arrives at the closed position.

In the preferred embodiment, the first means is a spring, the second means is a detent, the third means is a pin for engaging a notch, and the fourth means is a ramp for engaging the pin.

BRIEF DESCRIPTION OF THE DRAWINGS

FIG. 2 is a side view partly in sections of one of the struts of FIG. 1 in the collapsed position;

FIG. 3 is a view similar to that of FIG. 2 of the strut in the extended position;

DESCRIPTION OF THE PREFERRED EMBODIMENT

Figure 1:
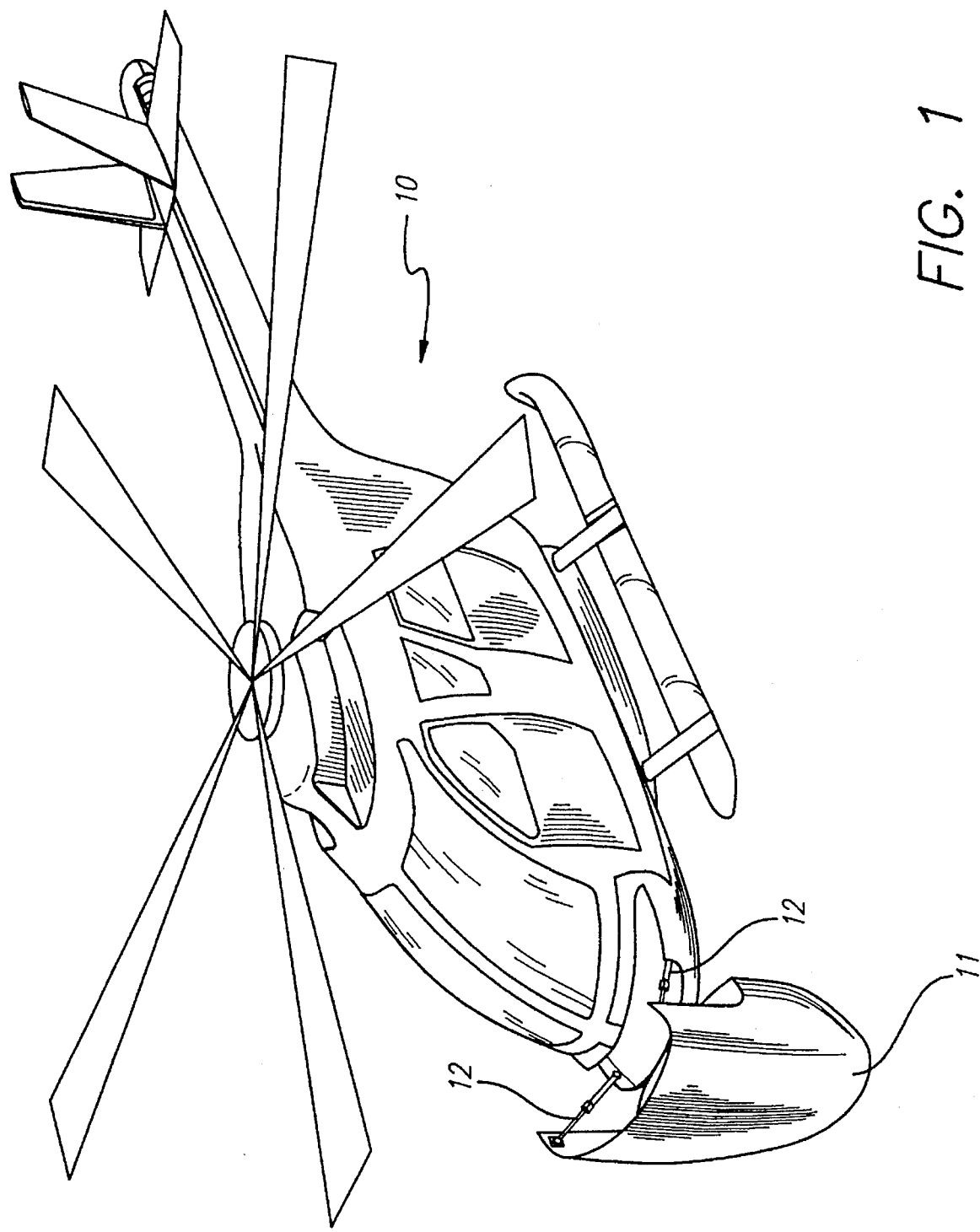
FIG. 1 is a perspective view illustrating a pair of struts incorporating the presently preferred embodiment of the invention, installed at a forward access cover of a helicopter.

In FIG. 1, a helicopter 10 is shown with a forward cover 11 in the open position. The cover is hinged along its lower edge to the body of the helicopter and is maintained in the open position by a pair of struts 12. The struts are movable between a collapsed position shown in FIG. 2 and an extended position shown in FIG. 3. The strut has telescoping elements 14, 15, with the element 14 moving within the element 15 between the collapsed and extended positions. The element 14, typically a rod, has an attachment bearing 16 at an outer end, and the element 15, typically a tube, has another attachment bearing 17 at its outer end. Preferably, a swivel is incorporated in a fitting 18 which joins the element 15 to the bearing 17, for ease of orientation of the bearings 16, 17. In use, one of the members being joined, such as the cover 11 is connected by a pin through the bearing 16, and the other member being joined, typically the body of the aircraft is joined to the strut by a pin through the bearing 17.

A catch 21 is pivotally mounted on a pin 22 in a fitting 23 carried on the member 15. The rod member 14 slides through the fitting 23 with the pin 22 riding in an axial slot 24 in the member 14.

Figure 6:
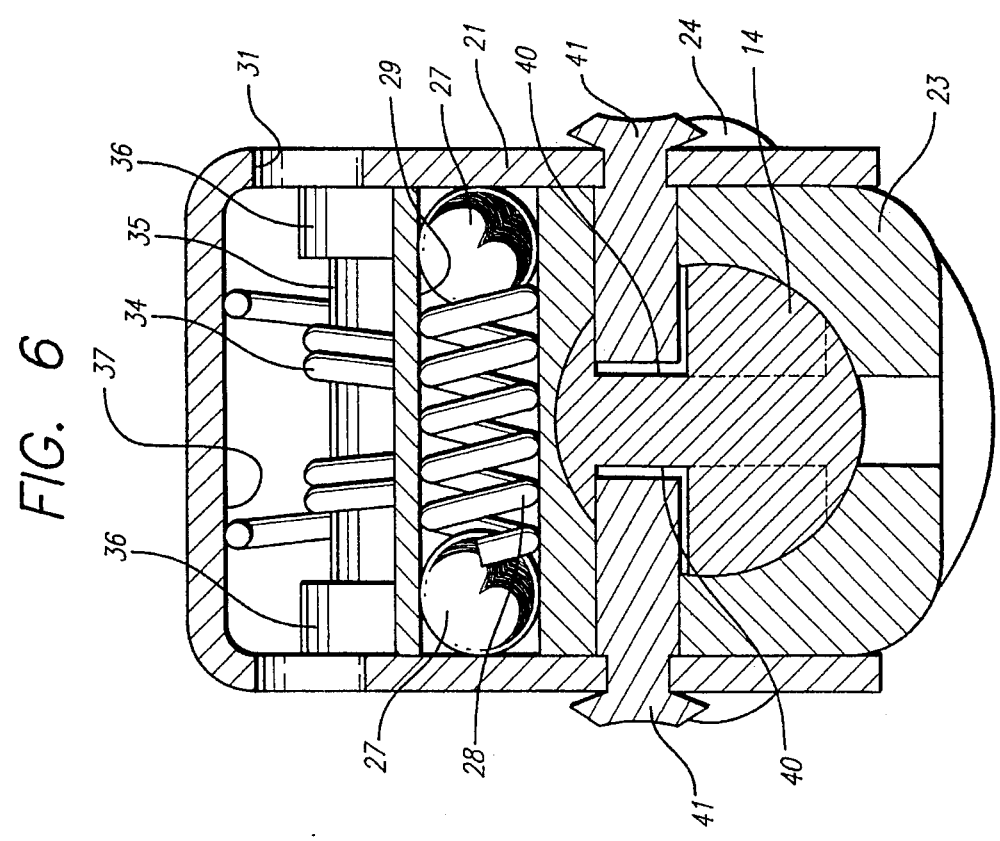
FIG. 6 is an enlarged sectional view taken along the line 6—6 of FIG. 2.

A pair of detent balls 27 and a spring 28 are carried in an axial passage 29 in a shoulder 30 on the fitting 23. When the catch 21 is in the position as shown in FIGS. 2 and 6, the detent balls push outward against the inner wall of the U-shaped catch 21. When the catch is pivoted on the pin 22 to the position of FIGS. 4 and 7, the detent balls are pushed outward into detent openings 31 of the catch 21.

A spring 34 is carried on a pin 35 mounted in spaced shoulders 36 of the fitting 23. The ends of the spring 34 bear against the fitting 23 and the inside of the top 37 of the catch 21 and urge the catch toward the locked position as shown in FIGS. 2, 3 and 6. The catch can be manually pivoted clockwise against the urging of the spring 34 from the position of FIGS. 2, 3 and 6 to the position of FIGS. 4 and 7, and the detent balls 27 will enter the detent openings 31 to maintain the catch in the unlocked position of FIGS. 4 and 7.

Figure 7:
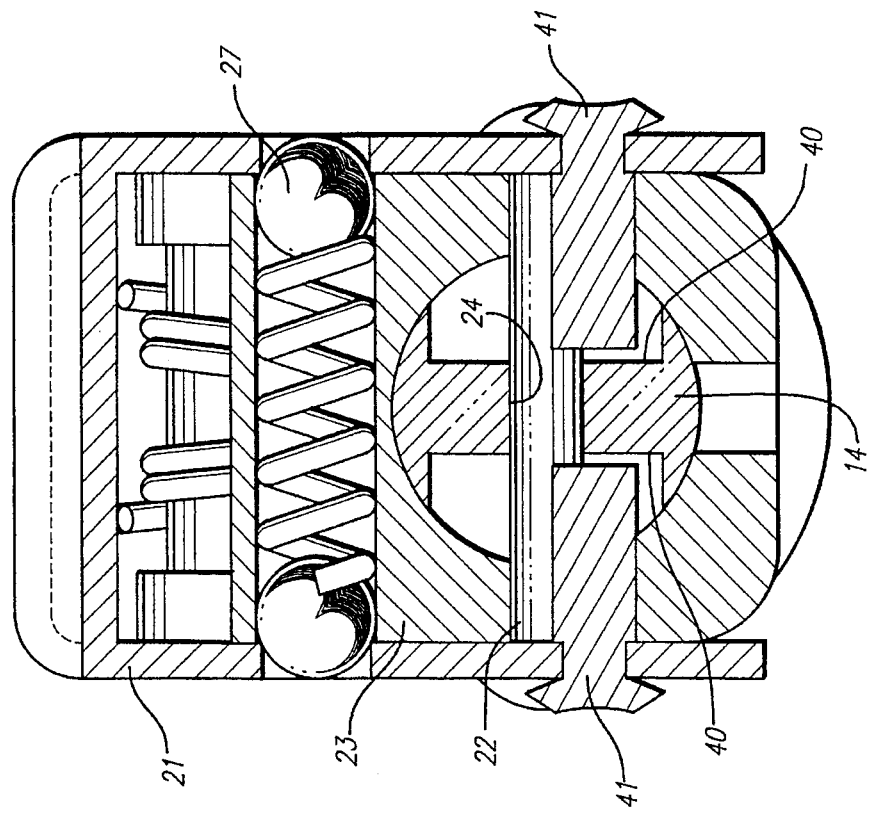
FIG. 7 is an enlarged sectional view taken along the line 7—7 of FIG. 4.

Two identical slots 40 are provided in the sides of the rod member 14. Two identical pins 41 are carried in the side walls of the catch 21 and ride in the corresponding slots 40, as seen in FIGS. 6 and 7. First ramps 42 are provided in the slots 40 an the outer end of the slots. Second ramps 43 are provided in the slots 40, preferably extending for nearly the entire length of the slots. Notches 44 are provided in the second ramps 43 adjacent the inner end of the slots.

In operation, with the door in the closed position, the strut is in the collapsed position of FIG. 2 and the catch is in the locked position of FIG. 2. The strut is moved to the extended position by pulling the two members apart to the position of FIG. 3. During this extension operation, the pins 41 ride along the ramps 43 of the slots 40, causing the catch 21 to rotate clockwise against the urging of the spring 34. When the strut is fully extended the pins 41 rise into the notches 44 as the catch is rotated counterclockwise by the spring to the position of FIG. 3. The placing of the pins 41 in the notches 44 returns the catch to the locked position and maintains the strut in the extended position of FIG. 3.

Figure 4:
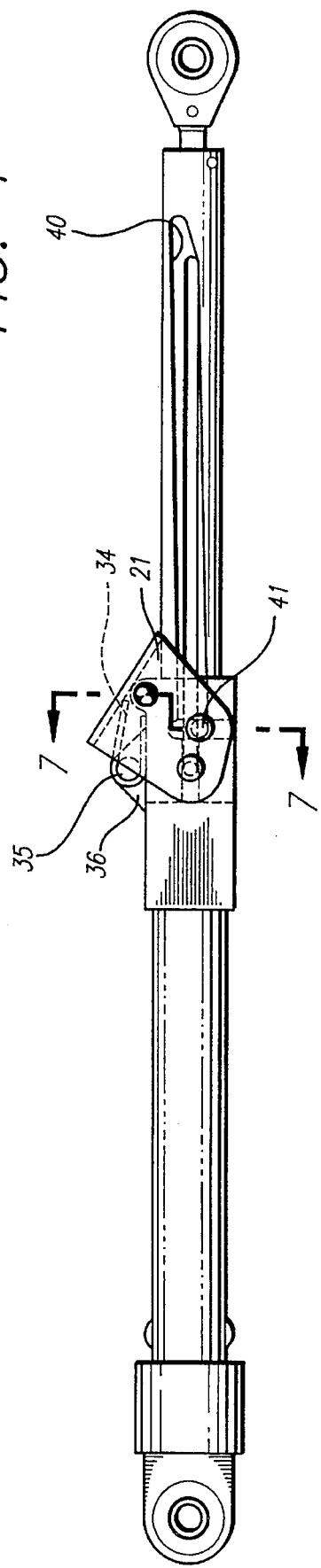
FIG. 4 is a view similar-to that of FIGS. 1 and 2 showing the catch moved to the unlocked position for collapsing of the strut.

When it is desired to collapse the strut, the catch 21 is manually pivoted clockwise as shown in FIG. 4, moving the pins 41 downward out of the notches 44 and bringing the detent balls 27 into the detent openings 31, thereby maintaining the catch 21 in the unlocked position. The operator can then leave the catch in the position of FIG. 4, walk around the vehicle, and change the second strut to the same unlocked position by depressing the catch 21 of the second strut.

Figure 5:
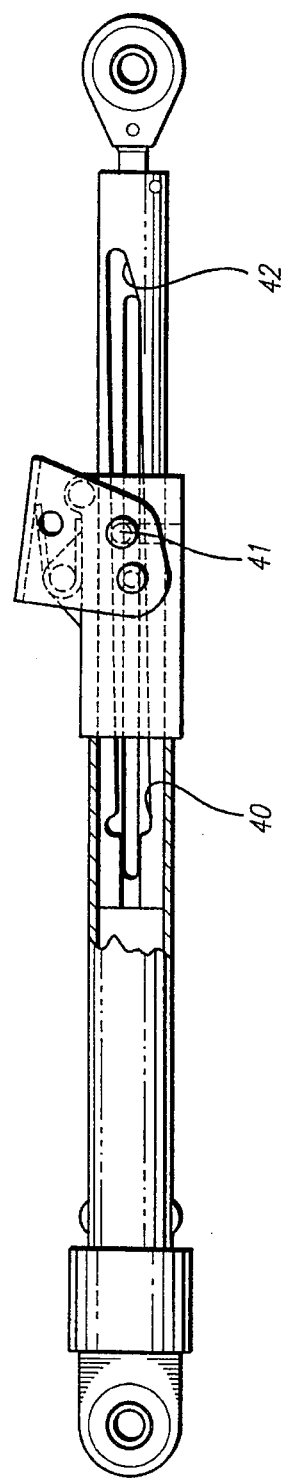
FIG. 5 is a view similar to that of FIG. 4 showing the strut being collapsed.

With both struts in the unlocked position, the operator can close the cover, collapsing the struts in the manner seen in FIG. 5. When the strut is fully closed to the collapsed position, the ramps 42 engage the pins 41 and move the catch counterclockwise out of the detent position of FIG. 4 to the latched position of FIG. 2. The ramp 42 is shown having an increased angle at the outer end of the rod member.

Thus, it is seen that with the present construction, the strut can be locked in the extended position and can be unlocked while in the extended position, with the unlocking of the catch being maintained without application of continuous pressure to the catch. This permits the actuation of a plurality of the struts by a single person, one at a time, prior to closing the cover and collapsing all of the struts during the closing operation.

We claim:

1. A collapsible strut for connection between a first member and a second member mounted on said first member, including in combination:

first and second telescoping elements movable between a collapsed position and an extended position, said second element having means defining a slot extending axially along said second element for the entire movement of said elements between said collapsed and extended positions;

a catch mounted on said first element for pivoting back-and-forth about a pivot axis over a limited angular range, said catch being manually moveable between a locked position and an unlocked position, with a pivot pin defining said pivot axis and with said pivot pin sliding in said slot of said second element as said elements move between said collapsed and extended positions;

first means interengaging said catch and said first element for urging said catch to said locked position;

seconds means interengaging said catch and said first element for maintaining said catch in said unlocked position;

third means carried on said catch and engageable with said second element for locking said elements in said extended position, with said catch moving said third means out of engagement with said second element when said catch is pivoted to said unlocked position permitting movement of said second element from said extended position to said collapsed position, with said second means maintaining said catch in said unlocked position while said second element is moving from said extended position to said collapsed position; and fourth means carried on said second element and engageable with said catch for moving said catch out of said unlocked position when said second element arrives at said collapsed position.

2. A collapsible strut for connection between a first member and a second member mounted on said first member, including in combination:

first and second telescoping elements movable between a collapsed position and an extended position;

a catch pivotally mounted on said first element, said catch being moveable between a locked position and an unlocked position;

first means interengaging said catch and said first element for urging said catch to said locked position;

seconds means interengaging said catch and said first element for maintaining said catch in said unlocked position;

third means carried on said catch and engageable with said second element for locking said elements in said extended position, with said catch moving said third means out of engagement with said second element when said catch is pivoted to said unlocked position permitting movement of said second element from said extended position to said collapsed position, with said second means maintaining said catch in said unlocked position while said second element is moving from said extended position to said collapsed position; and fourth means carried on said second element and engageable with said catch for moving said catch out of said unlocked position when said second element arrives at said collapsed position;

said second element having inner and outer ends and a longitudinal slot therebetween, with a notch in said slot adjacent said inner end, and said third means including pin means on said catch for engaging said second element notch when said second element is in said extended position.

3. A collapsible strut as defined in claim 2 wherein said fourth means includes a first ramp in said longitudinal slot adjacent said outer end thereof, with said first ramp engageable with said pin means to move said catch out of said unlocked position.

4. A collapsible strut as defined in claim 3 wherein said second means includes a spring detent on said first element and a detent opening in said catch, with said detent opening at said spring detent when said catch is in said unlocked position.

5. A collapsible strut as defined in claim 4 wherein said first means includes a spring carried on said first element and engageable with said catch to urge said catch to said locked position.

6. A collapsible strut as defined in claim 4 wherein said first means includes a spring carried on said first element and engageable with said catch to urge said catch to said locked position.

7. A collapsible strut as defined in claim 7 including a second ramp in said longitudinal slot, with said second ramp engageable with said pin means as said second element is moved from said collapsed position to said extended position to move said catch away from said locked position prior to engagement of said pin means with said second element notch.

8. A collapsible strut for connection between a first member and a second member mounted on said first member, including in combination:

first and second telescoping elements movable between a collapsed position and an extended position;

a catch pivotally mounted on said first element, said catch being moveable between a locked position and an unlocked position;

first means interengaging said catch and said first element for urging said catch to said locked position;

seconds means interengaging said catch and said first element for maintaining said catch in said unlocked position;

third means carried on said catch and engageable with said second element for locking said elements in said extended position, with said catch moving said third means out of engagement with said second element when said catch is pivoted to said unlocked position permitting movement of said second element from said extended position to said collapsed position, with said second means maintaining said catch in said unlocked position while said second element is moving from said extended position to said collapsed position; and fourth means carried on said second element and engageable with said catch for moving said catch out of said unlocked position when said second element arrives at said collapsed position;

said second means including a spring detent on said first element and a detent opening in said catch, with said detent opening at said spring detent when said catch is in said unlocked position.

9. A collapsible strut for connection between a first member and a second member mounted on said first member, including in combination:

first and second telescoping elements movable between a collapsed position and an extended position, each of elements having inner and outer ends, and a longitudinal slot between said inner and outer ends of said second element, with a notch in said slot adjacent said inner end;

a catch pivotally mounted on said first element, said catch being moveable between a locked position and an unlocked position;

spring means interengaging said catch and said first element for urging said catch to said locked position;

detent means interengaging said catch and said first element for maintaining said catch in said unlocked position;

pin means carried on said catch and engageable with said notch of said second element for locking said elements in said extended position, with said catch moving said pin means out of engagement with said second element notch when said catch is pivoted to said unlocked position permitting movement of said second element from said extended position to said collapsed position, with said detent means maintaining said catch in said unlocked position while said second element is moving from said extended position to said collapsed position;

a first ramp in said longitudinal slot and engageable with said catch for moving said catch out of said unlocked position when said second element arrives at said closed position; and a second ramp in said longitudinal slot and engageable with said pin means as said second element is moved from said collapsed position to said extended position to move said catch away from said locked position prior to engagement of said pin means with said second element notch.

* * * * *